United States Patent [19]
Kazel

[11] 3,808,596
[45] Apr. 30, 1974

[54] METHOD AND APPARATUS FOR PASSIVE MAPPING

[75] Inventor: Sidney Kazel, Chicago, Ill.

[73] Assignee: IIT Research Institute, Chicago, Ill.

[22] Filed: Feb. 1, 1971

[21] Appl. No.: 111,333

[52] U.S. Cl. ....... 343/100 ME, 343/5 CM, 250/334
[51] Int. Cl. ............................................. G01w 1/00
[58] Field of Search .................. 343/100 ME, 5 CM; 250/83.3 HP, 334

[56] References Cited
UNITED STATES PATENTS

| | | | |
|---|---|---|---|
| 3,134,902 | 5/1964 | Chase et al. | 250/83.3 HP |
| 2,458,654 | 1/1949 | Southworth | 343/100 ME |
| 3,155,964 | 11/1964 | Voles | 343/5 CM |
| 3,427,105 | 2/1969 | Ingalls | 356/5 |

OTHER PUBLICATIONS

L. Cutrona and L. Porcello: "On the Application of Coherent Optical Processing Techniques to Synthetic-Aperture Radar." Proc. of I.E.E.E. Vol. 54, No. 8, August 1966, [Pages 1026 to 1032 call No: TK5700 I7]

Primary Examiner—Benjamin A. Borchelt
Assistant Examiner—Denis H. McCabe
Attorney, Agent, or Firm—Fitch, Even, Tabin & Luedeka

[57] ABSTRACT

A passive mapping system employs an antenna or other sensing means having a receiving beam pattern which is scanned in azimuth while moving along a path relative to the area to be mapped. The received signal, after detection and other processing, is recorded on a moving record medium in such a manner that each emitting element in the mapped area generates a straight line of a certain intensity or contrast on the record medium with a slope corresponding to the emitting element range, and the position along the medium corresponding to the location of the antenna along the path. Subsequently, the record medium is processed to collapse or integrate each straight signal line into a point on a further record medium to produce a radiometric plan view map of the area.

18 Claims, 17 Drawing Figures

INVENTOR
SIDNEY KAZEL

ATTYS.

METHOD AND APPARATUS FOR PASSIVE MAPPING

The present invention relates to passive mapping techniques, and particularly to apparatus and methods for radiometric mapping. The present invention has particular applicability to airborne reconnaissance of intentionally generated and well defined radiation from ground transmitters, as well as to airborne radiometric mapping of terrain from the broad band emitted or reflected radiation from such terrain.

The general advantages of passive radio reconnaissance, as compared to radar or other active systems, lie principally in the area of concealing the presence and location of the mapping vehicle or aircraft, which is especially important in military situations. One common technique of passive radio mapping of radio transmitters is accomplished by the well known method of triangulation. However, an improved method of and apparatus for passive mapping which does not require triangulation, and which may be employed to plot out the point locations of such emitting sources in a continuous manner, is disclosed and claimed in co-pending application Ser. No. 709,367, of the same inventor, filed Feb. 29, 1968, now U.S. Pat. No. 3,560,973 and assigned to the assignee hereof.

With respect to the radiometric mapping of terrain, this has heretofore been conventionally accomplished from an aircraft flying at high altitude and having a "down-looking" receiving antenna which rapidly scans back and forth at right angles to the flight line with a narrow pencil beam to map the region immediately below the aircraft along the flight line. Such "down-looking" radiometry techniques, however, have a very limited capability for mapping out to long ranges to the side of the aircraft, due to the poor resolution and accuracy inherent in such systems at long range. Another defect of such conventional radiometry is that elevated features of the terrain, such as mountains, are mapped with great distortion when the mapping aircraft flies at relatively low altitudes.

Although the passive mapping techniques of the aforementioned co-pending application may be employed advantageously for radiometric mapping of discretely distributed emitters, the resolution provided thereby is somewhat limited for the continuously distributed emitters of broad band terrain mapping.

Accordingly, it is an object of the present invention to provide an improved passive mapping system and method for readily mapping large numbers of emitters which form a continuous distribution of radiating or reflecting sources.

It is another object of the invention to provide a radiometric mapping system and method for obtaining greatly improved mapping resolution and accuracy over prior systems at ranges which are large compared to aircraft altitude.

It is a further object of the invention to provide an improved radiometric mapping system and method which does not distort the location of elevated features of the terrain when mapped from a low flying aircraft.

These and other objects of the invention are more particularly set forth in the following detailed description and in the accompanying drawings, of which:

FIG. 4($a$)–($e$) is a simplified graphical and diagrammatic illustration showing the sequential positioning of the airborne platform of FIG. 2 relative to fixed short and long range emitters to illustrate certain principles of the present invention;

FIG. 5($a$)–($b$) is an elevational view of a portion of the signal film record medium employed in the present embodiment of the invention graphically showing the signal data produced thereon due to the short and long range emitters of FIG. 4 for the aircraft positions there shown, and the individual signal contributions due to each emitter to further illustrate certain principles of the invention;

FIG. 6($a$)–($b$) is an elevational view of a portion of the signal film record medium showing the total signal data due to one short and one long range emitter and to many short and long range emitters to further illustrate certain principles of the present invention;

FIG. 8($a$)–($c$) is a diagrammatic illustration showing certain basic principles of operation of the optical processor of FIG. 7.

The principles of the present invention are described herein specifically in their application to radiometric mapping by radio wave emission or reflection from terrain. However, it will be understood that the basic principles of the invention are also applicable to radiometric mapping by all other forms of electromagnetic radiation, such as infrared, light, ultra-violet, and X-rays, and to non-electromagnetic forms of radiation as well, such as acoustic and atomic particle radiation. Additionally, of course, they are applicable to the detection and mapping of transmitters of intentional or "man-generated" radiation, typified by well defined frequency ranges, for radio reconnaissance or the like, as previously indicated.

The basis of radiometric mapping of terrain is that each element of terrain emits and/or reflects electromagnetic radiation. Emitted radiation increases with the temperature of the terrain elements, while reflected radiation is proportional to the external illumination of the terrain element. In either case, the present embodiment of the invention is concerned with the passive reception of such radiation and the production therefrom of a planimetric map of the terrain.

Figure 1:
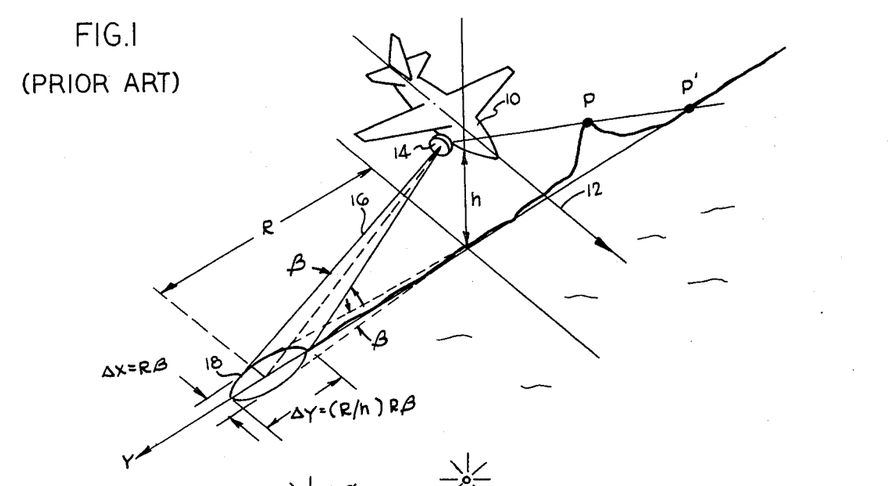
FIG. 1 is a diagrammatic illustration showing certain problems inherent in conventional "down-looking" radiometric mapping techniques of the prior art.

Referring to FIG. 1, there is shown the general operation of a conventional, or "down-looking," radiometry system wherein a mapping aircraft 10 typically flies at an altitude $h$ along a straight line, constant velocity path 12 termed the "flight line" while a receiving antenna 14 located under the aircraft rapidly scans a narrow pencil beam 16 back and forth at right angles to the flight line 12 to form a raster scan of the terrain below the aircraft. The included angle between the extreme positions of the beam 16 is typically on the order of from 90° to 120°. The resolution cell 18 produced by such conventional radiometry is the area on the ground intercepted by the antenna beam 16. The resolution cell 18, as shown in FIG. 1, is degraded from a circular configuration when the range R to the resolution cell is much greater than the aircraft altitude $h$, the range being measured along the ground plane normal to the orthogonal projection thereon of the flight line 12. This degradation occurs only in the range resolution, $\Delta y$, and is of course due to the grazing angle at which the antenna beam 16 intercepts the ground. For the ratio $R/h$ much greater than unity, and for small beam angles $\beta$, $\Delta y$ is well approximated by $$\Delta y = R\beta(R/h)$$

The cross-range resolution $\Delta x$ is not degraded, and for small $\beta$ is well approximated by $$\Delta x = R\beta$$

Thus, the range resolution $\Delta y$ can be seen to be degraded by the factor $R/h$ relative to the cross-range resolution $\Delta x$. Consequently, at long ranges, or low altitudes, the range resolution for such conventional radiometry systems is so degraded that no useful mapping information can be obtained.

An additional degradation which occurs in such conventional radiometry for ranges which are large compared to aircraft altitude is the distortion of elevated points in the map. Thus, as also illustrated in FIG. 1, an elevated point P will be mapped incorrectly as lying at point P′ in the true ground plane.

In accordance with the technique of the present embodiment of the invention, the mapping aircraft scans the terrain in a side-looking, rather than a down-looking, mode. The received signal, after detection and differentiation, is recorded on a film in such a manner that each small emitting element of the terrain generates a straight line on the signal film, with a slope inversely proportional to emitter range. Subsequently, the developed signal film is processed to collapse or integrate each straight line signal into a point on an image film, or output map, thereby producing a planimetric map of the region off to the side of the aircraft.

Figure 2:
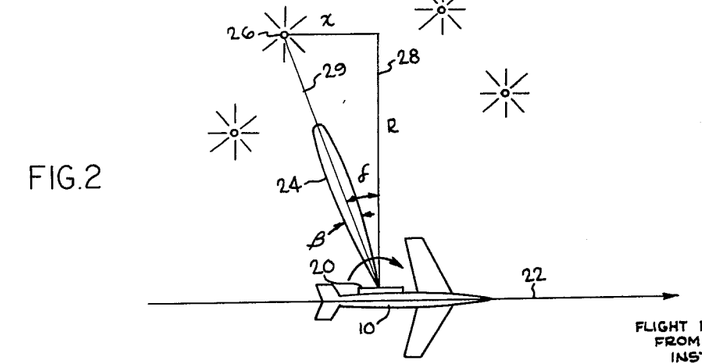
FIG. 2 is a simplified plan view of an airborne platform and scanning antenna employed in accordance with the principles of the present embodiment of the invention.
Figure 3:
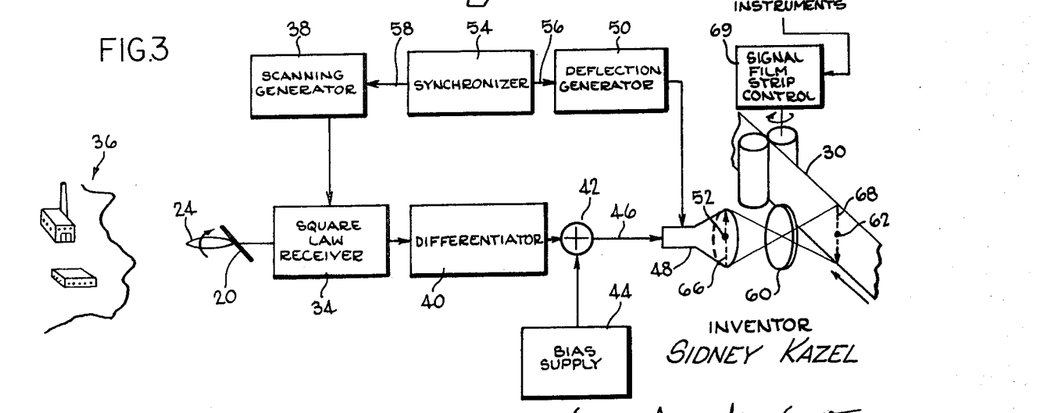
FIG. 3 is a generalized block diagram of the receiving and data recording portions of the present embodiment of the invention.
Figure 4A:
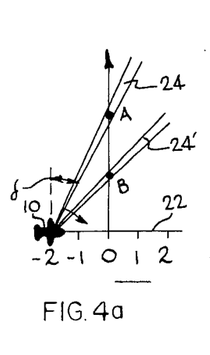
Figure 4B:
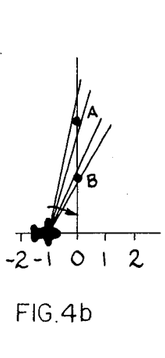
Figure 4C:
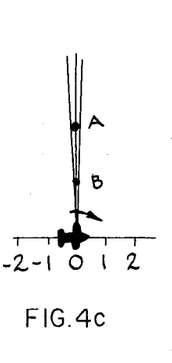
Figure 4D:
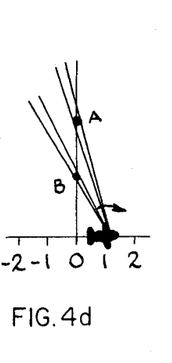
Figure 4E:
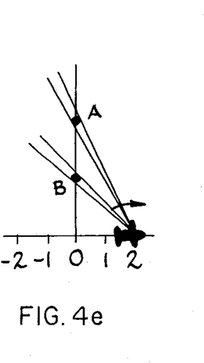
Figure 7:
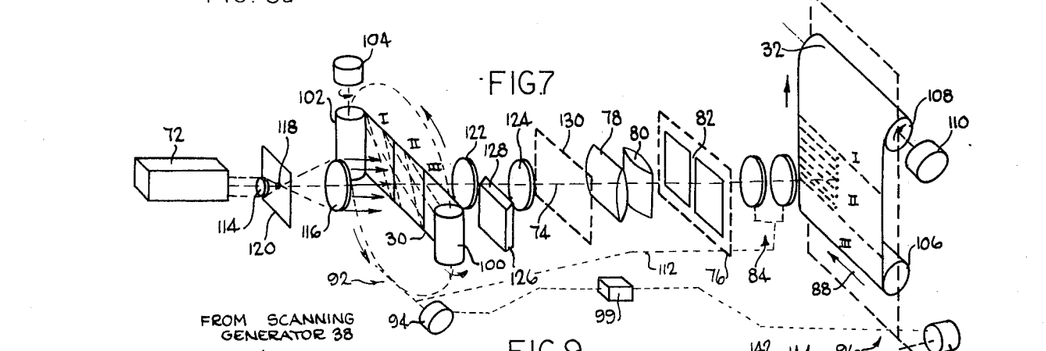
FIG. 7 is a schematic diagram of the optical processor portion of the system which produces an image output record film or map from the signal record film in accordance with the present embodiment of the invention.

In general, and referring now to FIGS. 2, 3 and 7, the present passive radiation mapping system comprises radiation sensing means, illustrated in FIG. 2 as an electronically scanned long, linear antenna 20, adapted to be moved relative to an area to be mapped by aircraft 10 along a path whose projection on the ground plane is denoted as the base line 22. The linear antenna 20 is mounted on the side of the aircraft and has a receiving narrow fan-beam pattern 24 of width $\beta$ in the azimuth dimension. This provides a signal indicative of the intensity of the radiation received by the antenna from the direction of the beam, as from the point emitter 26 which is one of four exemplary illustrated point sources of radiation. Scanning means, to be hereinafter described, is provided for causing the beam 24 to be rapidly and repeatedly scanned in azimuth over an angle of, for example, about ±45° from the broad side direction 28, as indicated by the angle $\delta$ measured from the broad side direction (perpendicular to the base line 22)

to the longitudinal axis 29 of the beam 24. The beam 24 angularly scans the area to be mapped about the antenna as the antenna is moving relative to the area along the base line path 22, and is shown in a position wherein one particular radiation emitting element of terrain 26 is encountered at an angle $\delta$ of about 30° from the broad side reference direction 28. Recording means, illustrated generally in FIG. 3, is responsive to the signals from the sensing means 20 for providing intensity modulated indicia in the form of data or signal lines on a signal record medium or film 30 corresponding to the angular scans of the terrain by the sensing means. Finally, processing means, illustrated generally in FIG. 7, is responsive to the recorded data lines on the signal record medium 30 for deriving therefrom an output or radiometric map on a further record medium 32 of the area scanned by the sensing means 20 as the aircraft 10 flies along the base line path 22 adjacent the area to be mapped.

More particularly, referring to FIG. 3, the receiving and signal recording system comprises the antenna 20, which in the illustrated embodiment is of the frequency-scanning type, having its output coupled to a square-law receiver 34 which provides the periodic scanning of the antenna beam 24 in azimuth over the illustrative terrain area 36 by a periodically varying voltage from a scanning generator 38 controlling a varactor tuning circuit in the receiver. As will be described in greater detail hereinafter, the square-law receiver 34 produces an output which is linear in average power; i.e., the receiver 34 produces output signals in which superposition holds true relative to its input signals from the antenna. The output signal of the receiver 34 is fed to a differentiator circuit 40 of conventional type which takes the time derivative of the output signal and supplies the differentiated signal to a summing circuit or adder 42. The adder 42 has a d.c. voltage supplied thereto from a bias supply 44 which is combined with the signal from the differentiator 40 to produce a unipolar signal on adder output lead 46.

The unipolar signal on output lead 46 from the adder 42 is applied to the intensity control element of a cathode-ray tube 48 for intensity modulating the cathode-ray beam thereof. The vertical deflection circuit of the cathode-ray tube 48 has applied thereto a periodically varying voltage from a deflection signal generator 50 for vertically deflecting the cathode-ray beam, and consequently the output spot of light 52 on the face of the tube, in proportion to tan $\delta$ where $\delta$ is the azimuth antenna scan angle as previously described. A synchronizer circuit 54 provides periodic trigger pulses at dual output leads 56 and 58 for synchronizing the operation of both the deflection generator 50 and the scanning generator 38, respectively. The cathode-ray tube 48 is otherwise connected to conventional operating circuitry well known in the art.

The light spot 52 from the cathode-ray tube 48 is imaged by relay lens 60 into a signal spot 62 on the signal film 30 in an inverted trace of the CRT beam. That is, a single complete angular scan of the antenna beam 24 thus results in a single vertical scan 66 of the cathode-ray tube output light spot 52 and the corresponding inverted trace 68 of the signal spot 62 on the signal film 30.

The signal film 30 is preferably a continuous strip of photographic film which moves horizontally, as shown, at constant speed when the velocity of the mapping aircraft 10 is constant; however, conventional sensing and control means 69 responsive to the flight parameters from the aircraft instruments varies the speed of the signal film 30 in proportion to the velocity of the aircraft 10 when the velocity departs from a constant value, so that a known proportion or correlation is always maintained between the aircraft velocity and the speed of the signal film. Thus, the displacement or distance of a given signal spot or vertical trace along the film always corresponds in a known manner to the distance of the aircraft 10 from a given location or geographic point along its flight path.

More specifically, with reference to the nature of the square-law receiver 34, if $E_1$ and $E_2$ are the voltages received by the antenna 20 from two uncorrelated sources of radiation, the output of the square-law receiver, prior to low-pass filtering which is preferably employed therein, is $$(E_1 + E_2)^2 = E_1^2 + E_2^2 + 2E_1E_2$$

With a low-pass filter in the receiver output, an averaging effect is produced, resulting in an output from the receiver 34 corresponding to $$\overline{E_1^2} + \overline{E_2^2} + \overline{2E_1E_2}$$

where the superbar denotes average value. For uncorreleated sources $E_1$ and $E_2$ the average product $E_1E_2$ is zero, leaving a net output corresponding to $$\overline{E_1^2} + \overline{E_2^2}$$

Thus, the square-law receiver 34 produces an output which is linear in average power, as previously indicated.

The differentiator 40 is then used to reject the average level of the received signal, since the fluctuations in the received signal as the antenna beam 24 scans in azimuth are very small compared to the average, or d.c. level, and this average value would otherwise saturate the signal film 30. Since the information on the detailed features of the terrain is essentially contained in the signal fluctuations, little information of significance is lost by rejecting the average value. Of course, other alternative methods of performing this rejection may be employed such as by determining the average value and canceling it with an equal and opposite voltage; however, differentiation is preferred because of its simplicity and also because it improves the mapping resolution of the system.

The output of the differentiator 40 is a bipolar signal, while of course the cathode-ray tube light output is unipolar, varying in intensity from some black (or gray) level to various brightnesses by increasing intensity in response to the amplitude of the signal. Also, the signal film 30, being photographic, responds only to the intensity of the light, and can be also considered unipolar. Thus, the bias voltage supplied from the bias supply 44 and added to the bipolar differentiated signal shifts the reference level and produces a unipolar signal consistent with the characteristics of the cathode-ray tube 48 and the signal film 30, preserving the information content of the bipolar differentiated signal undistorted. The required bias voltage to accomplish this shift is much smaller than the rejected average value of the receiver output, and therefore, does not saturate the signal film. The bias voltage thus sets the reference for the intensity of the signal spot 62 on the film for some level of received radiation.

Now, at any azimuth position of the scanning beam 24 there may be, of course, numerous and random intensity sources of radiation in the beam, and consequently numerous signals may be received by the antenna 20. Thus, in accordance with the principles of the present invention, means are provided for resolving these sources. More particularly, the recording means, as illustrated for example in FIG. 3, produces data lines on the moving signal film 30 associated with respective emitting points having a first component in one coordinate on the film corresponding to the tangent of the scan angle of the antenna beam, and thus providing range information, and a second component in another coordinate on the film corresponding to the distance of the antenna from some predetermined geographic location along the base line path, that is, from some point of reference. In the illustrated system, the two coordinates are orthogonal, the first being taken perpendicularly to the longitudinal axis or direction of motion of the film and the second being taken along the direction of film motion.

To illustrate this more clearly, reference is made to FIG. 4 showing the mapping aircraft 10 in plan view at five consecutive positions as it flies at constant velocity along straight-line course 22 past two sources of radiation, a long range source A and a short range source B. At each position of the aircraft 10, the scanning beam is shown in the two positions 24, 24' at which it intercepts the sources A and B, respectively. Then, it may be seen that, while the two sources A and B are received simultaneously in the one beam position, shown in FIG. 4(c), they are generally received at different scan angles $\delta$. For the purpose of simplicity, it is assumed that the average power received from the sources A and B individually is of unit magnitude. Then, when both sources are received simultaneously, as in FIG. 4(c), the average received power is of magnitude two, and this position is arbitrarily taken as zero along the flight path or base line 22 of FIG. 4. Therefore, the other equally spaced positions of the aircraft 10 in the example are then respectively indicated as $-2$, $-1$ to the left of the zero point, and $+1$ and $+2$ to the right of the zero point.

Figure 5A:
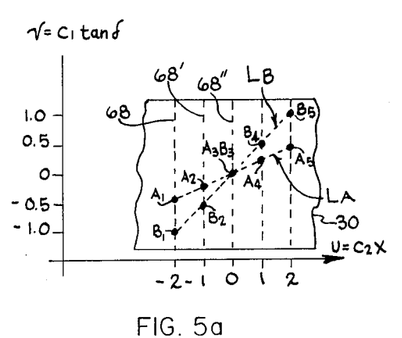

FIG. 5(a) shows the format in which the received signals from the antenna on the aircraft 10 in FIG. 4 are recorded on the signal film 30. The vertical axis or ordinate $v$ of the signal film is proportional to the tangent of the azimuth scan angle $\delta$ or $$v = c_1 \tan \delta$$

while the horizontal axis or absissa $u$ of the signal film is proportional to the along-track position $x$ of the mapping aircraft, i.e., the distance along the flight path from some predetermined location, or $$u = c_2 x$$

where $c_1$ and $c_2$ are constants of proportionality. Each scan of the antenna results in one approximately vertical trace 68 of the signal spot on the signal film, as previously indicated. The departure of the trace 68 from vertical, caused by the longitudinal or horizontal motion of the signal film, is generally small because of the rapidity with which the antenna beam is scanned relative to the film motion, and is of no particular consequence.

The trace 68 is thus brightened or increased in intensity or contrast by an increase in the receiver output as the narrow antenna beam azimuthally scans past a radiation source, with the result that each source in the field of view of the antenna produces a small signal spot, such as 62 in FIG. 3, on the trace. Because of the rapidity with which the scanning of the antenna beam is repeated, a given source is encountered on many successive scans, resulting in a succession of closely spaced signal spots on the signal film. The signal spots produced by the various radiation sources encountered during a given scan will be produced along a given vertical trace 68 corresponding to that particular scan, while successive sets of points corresponding to the various radiation sources encountered on successive azimuth scans will appear on successively displaced vertical traces 68, 68', 68'', etc., along the length of the signal film as each azimuth scan of the antenna beam takes place with the aircraft at successively different locations relative to the radiation sources (and relative to some fixed reference location along the flight path).

For example, in FIG. 5(a) there is shown the succession of signal spots resulting from five scans of the antenna beam past sources A and B at the five positions of the mapping aircraft 10 in FIG. 4. When the aircraft 10 is at the position −2 as shown in FIG. 4(a), and assuming a clockwise sweep of the beam 24, signal spot $A_1$ is produced as the cathode-ray beam follows its vertical deflection path as previously described. When the beam is in the position 24' during that same scan and encounters souce B signal spot $B_1$ is produced on that same vertical trace. When the aircraft 10 is in the position −1 along the flight path as shown in FIG. 4(b), the antenna beam encounters souce A at an earlier time, or smaller azimuth angle $\delta$, in a later scan corresponding to the vertical trace 68' on the signal film, and produces signal spot $A_2$ which is correspondingly somewhat higher on the signal film along the $v$ coordinate (in proportion to the new tan $\delta$). The short range source B is then encountered by the antenna beam, producing signal spot $B_2$ further down the trace 68', at a larger azimuth angle $\delta$. When the aircraft 10 is at the arbitrary zero position as shown in FIG. 4(c), a single spot $A_3B_3$ of double intensity is recorded on the vertical trace 68'' corresponding to a later antenna scan when both sources are broadside of the aircraft. Likewise, as the aircraft moves to positions +1 and +2 as shown respectively in FIG. 4(d) and (e), the scanning beam 24 now encounters the sources A and B in reverse order producing signal spot $B_4$ on a successive trace corresponding to the aircraft position in FIG. 4(d) and signal spot $A_4$ on the same trace below spot $B_4$, and producing signal spots $B_5$ and $A_5$ on a later trace corresponding to the scan occurring when the aircraft is in the position shown in FIG. 4(e) in the same manner.

Figure 5B:
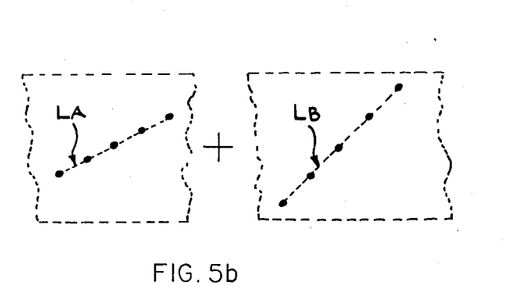

The signal spots illustrated in FIG. 5(a) are shown broken down into the separate contributions due to sources A and B separately in FIG. 5(b) to show that the system is linear and superposition applies with respect to each point source or emitter. Thus, it can be seen that each source produces its own line of points on the signal film independent of the presence of other sources, and the signal spots produced by the A source in FIG. 4 form the line $L_A$ and the signal spots produced by the B source form the line $L_B$.

That successive signal spots due to a given radiation source lie on a straight line on the signal film can be demonstrated more quantitatively by noting from FIG. 2 that the tangent of the azimuth scan angle $\delta$ is equal to $x/R$, where R is the range or normal distance on the ground plane from the base line 22 to the source and $x$ is the along-track distance on the ground plane parallel to the base line from the source to the broadside reference projection 28 which locates the antenna position. Now, since $v = c_1 \tan\delta$ and $u = c_2 x$, combining these equations gives $$v = (c_1/c_2) u/R$$

which is the equation of a straight line. It is also shown by this last equation that the slope of the straight line is inversely proportional to the range R of the radiation source associated with that line. Thus, $R = K/\text{slope}$, where K is a constant equal to $c_1/c_2$.

Figure 6A:
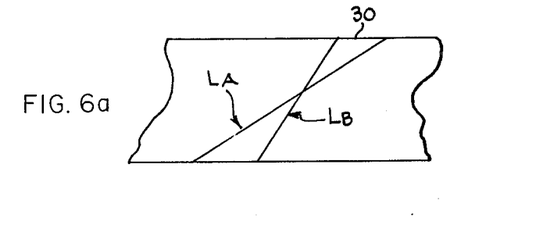
Figure 6B:
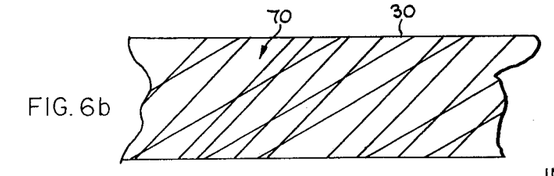

In actual practice, the five scanning positions illustrated in FIG. 4 would be only a small fraction of the total number of scans, and successive vertical traces 68 in FIG. 5(a) corresponding to each scan would be laid down contiguously so that the succession of signal spots due to a particular source form a true solid signal line, and the solid signal lines which would then be produced by sources A and B of FIG. 4 are shown in FIG. 6(a). Then, also, the terrain will generally have large numbers of sources, theoretically at every point, and the signal film 30 will be filled with a continuum of overlapping straight signal lines 70 of various slopes as diagrammatically illustrated in FIG. 6(b). In the portion of the signal film 30 depicted in FIG. 6(b), each elemental point-like radiating source of the terrain appears as a straight signal line with slope inversely proportional to range R as indicated previously. The location or displacement of the signal line, i.e., its coordinate along the length, or u-axis, of the signal film, corresponds to the along-track position $x$ of the radiation source from a predetermined reference location.

To produce a map of the terrain, it is then necessary to sort out the myriad signal lines 70 according to their displacements and slopes, and transform them back into points in their proper plan view positions. Thus, the processing means for the signal film 30 determines the slope of each of the signal lines and the displacement at every point along the film to derive the range and along-track position of each elemental radiating source with their corresponding intensities (or power) given by the intensities along the recorded lines on the signal film.

In accordance with the present embodiment of the invention, both the sorting of the signal lines and their transformation into properly positioned points are accomplished by optical processing means. The optical processor is generally schematically illustrated in FIG. 7 and comprises means for producing a collimated beam of light, shown as laser 72, for illuminating the signal film 30 which has been developed to form a film transparency and which is rotated about the optical axis 74 to an arbitrary angular position corresponding to a slope of particular signal lines on the transparency. Refracting means, illustrated as orthogonal first and second cylindrical lenses 78 and 80, is disposed on the optical axis 74 and is responsive to the light passing through the transparency 30 to transform the particular signal lines into image points at image plane 76. A narrow vertical slit 82 defined by suitable masks located in the image plane 76 allows the image points to be reimaged on the image film record medium, or output map, 32 via lens system 84.

Figure 8A:
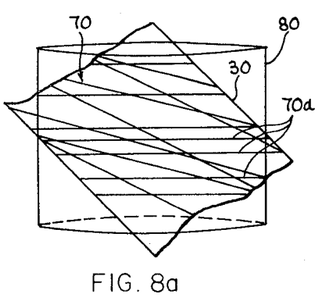
Figure 8B:
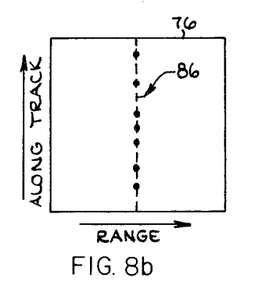

More particularly, referring to FIG. 8(a), the film transparency 30 is shown as being rotated to the arbitrary position wherein all signal lines 70a that have a specific slope are horizontal and have a given selective orientation relative to the orthogonal cylindrical lenses, and in particular to the second or horizontal axis-selecting lens 80. This "horizontal" cylindrical lens 80 has power only in the horizontal plane and horizontally collapses each line of light projected from the signal lines 70a to a separate point at the image plane 76, which is located at the principal focus of lens 80. The resulting line of points 86 at plane 76 corresponding to all lines 70a of the same specific slope on a given portion of the film is shown in FIG. 8(b), and lie in the slot aperture 82 shown in FIG. 7. Likewise, the first or vertical axis-selecting cylindrical lens 78 has power only in the vertical plane and re-images signal lines 70a in the vertical direction at image plane 76. Non-horizontal signal lines as illustrated on the film transparency 30 are defocused by horizontal cylindrical lens 80 and appear at image plane 76 as a weak, diffuse, barely visible background.

Thus, it can be seen that the set of image points 86 in FIG. 8(b) is due to radiation sources at only one particular range, corresponding to the particular slope which has been rotated to the horizontal position in FIG. 8(a). The vertical separation of the image points 86 corresponds to the along-track separation of the several radiation sources, and these image points are then re-imaged on the output map 32 at a particular position along the abscissa corresponding to the range indicated by the slope of the signal lines on the signal film transparency.

Figure 8C:
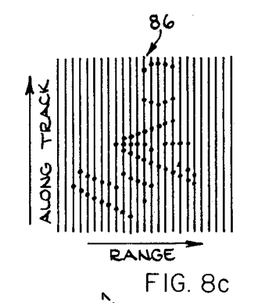

Thus, by rotating the signal film 30 about the optical axis 74 of the optical processor, the signal lines of different slopes, corresponding to radiation sources at different ranges, are successively imaged at the slit 82 and relayed onto the output film 32 which moves horizontally (as indicated by the arrow 88) as the signal film 30 rotates counterclockwise (as indicated by the arrow 90), with the result that successive range increments of the terrain appear side-by-side on the image film 32. This eventually builds up a complete plan view of the various terrain features, as indicated in FIG. 8(c). The output relay lens system 84 changes magnification by any suitable means in synchronism with the rotation of the signal film 30 to compensate for variations in the scale factor in the along-track direction as a function of the rotation angle of the signal film.

When the signal film 30 has been rotated through the entire range of signal line slopes of interest, a segment of the terrain corresponding, for example, to section II on the signal film and on the output film as shown in FIG. 7, will have been mapped out, section I having been previously mapped out. The next section, III, of thd signal film and of the output film is then brought into place by winding both signal and output films the required amount, the laser 72 being turned off while the new section is being brought into position onto the optical axis 74. With section III in place, the process of rotating the signal film 30 about the optical axis 74 and horizontally translating the image output film 32 is repeated unitl section III of the output film has also been mapped out, and so on, for as many sections as may be desired.

Mechanical means, indicated in dotted line as 92 in FIG. 7, is provided for rotating the signal film 30 and associated mechanisms, about the optical processor axis 74, and may comprise a planetary gearing arrangement rotated by a motor 94 through a suitable shaft and worm gear. Synchronized with the rotation of the signal film 30 by the rotating means 92 the output film 32 and associated mechanisms are moved horizontally to traverse the optical axis by any suitable means. For example, the output film 32 and associated mechanisms may be supported in a movable frame or carriage assembly, indicated in dotted line as 96, which may be driven by a motor 98 through a suitable rack and pinion arrangement. The motors 94 and 98 may have their speeds synchronously controlled by controller 99 which may be of any conventional type for that purpose, such controllers being well known in the art.

The mapping of each successive segment of the terrain by successive processing of the various sections I, II, III, etc., may be accomplished by transferring the signal film 30 from a supply roll 100 to a take-up roll 102 by selective rotation of the latter by means of a suitable motor 104. Likewise, the output film 32 is moved to position each successive section on the optical axis by the transfer from a supply roll 106 to a take-up roll 108 the latter of which is driven by a further motor 110. Both motors 104 and 110 are operated simultaneously to position each section of the respective films to the optical axis of the processor, and conventional switching circuitry may be employed to turn off the laser 72 during the operation of these motors.

Additionally, the pair of lenses shown in FIG. 7 which form the relay lens system 84 are positioned in a manner to synchronize the changes in magnification obtained from the compound lens system with the rotation of the signal film 30 through a suitable mechanism and linkage indicated by dotted line 112 coupled to the output of the signal film rotating motor 94. The lenses 84 may be mounted in longitudinally displaceable rotational cylinders typically employed for automatic focusing zoom lens systems.

More specifically, the coherent light beam from the laser 72 is expanded to the desired diameter for a given section of the film by the combination of a condensing lens 114 and a collimating lens 116. A small pin hole 118 is defined by a plate 120 at the focus of the condensing lens 114 for eliminating irregularities in the wavefront of the collimated beam. The collimated beam of the desired diameter then passes through a section of the signal film 30, both being centered on the optical axis 74 of the processor. Located on the other side of the signal film 30 are means for eliminating undesired components on the signal film. Particularly, this is accomplished by a combination of lenses 122 and 124 and a frequency plane filter 126 located at the principal focus of the lens 122. The frequency plane filter 126 comprises a horizontal knife-edge 138 located on the optical axis 74. The average, or gray level component of the signal film 30, which carries no useful information, is focused to a point on the optical axis 74 by lens 122 and is blocked by the opaque knife-edge 128. The light from the desired signal lines 70 diffracts around the knife-edge 128 and is re-imaged by the lens 124 at a plane 130 located after the lens 124 and before the first cylindrical lens 78. The reimaging of the signal film 30 at plane 130 without the gray level average component greatly enhances the contrast of the output map 32.

An alternative form of frequency plane filter which may be employed instead of the knife-edge 128 comprises a masking member with a vertical half-slit from the top of the member to a point terminating just above the optical axis 74 so that the average, or gray level, component of the signal film is focused below the half-slit and is thus blocked. Horizontal lines on the signal film 30 will appear as vertical lines at the frequency plane filter and will pass through the vertical half-slit.

Figure 9:
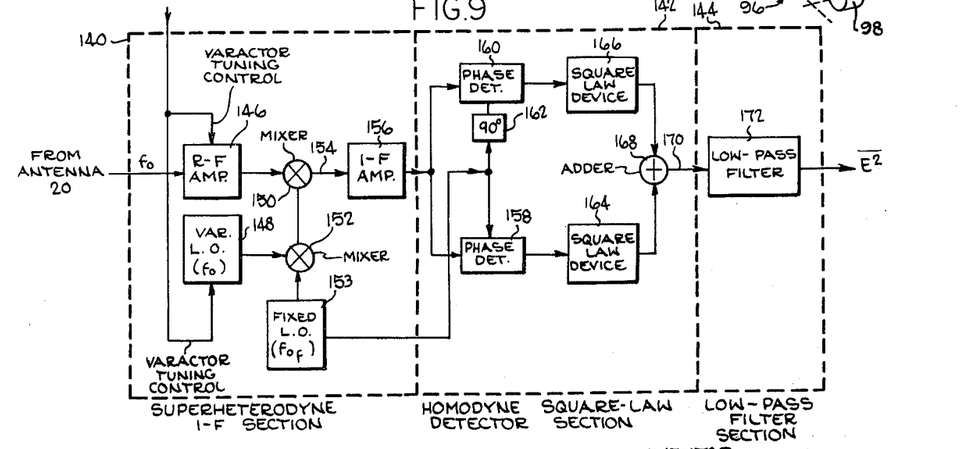
FIG. 9 is a block diagram of a square-law receiver which may be employed in the receiving and recording portions of the system shown in FIG. 3.

Referring now to FIG. 9, there is shown a more detailed diagram of the square-law receiver 34 of FIG. 3. The receiver 34 generally comprises a superheterodyne IF section 140 responsive to the voltage from the antenna 20 and to the output from the scanning generator 38, a homodyne square-law detector section 142 responsive to the IF section 140, and a low pass filter section 144 responsive to the detector section 142 to provide an output voltage corresponding to the average of the square of the input voltage as hereinbefore described. The IF section 140 comprises a RF amplifier 146 and a variable frequency local oscillator 148 which are both varactor tuned by the control voltage of the scanning generator 38 about a center frequency ($f_0$), and each has its output fed to a respective mixer 150 and 152. A fixed local oscillator 153 at the IF frequency ($f_{if}$) provides a further input to the mixer 152 so that the output therefrom is a signal comprising the sum of the variable local oscillator frequency ($f_0$) plus the intermediate frequency ($f_{if}$) which signal is then supplied to the mixer 150 to provide an output on lead 154 at the intermediate frequency ($f_{if}$) in the usual superheterodyne manner. The intermediate frequency signal from the mixer 150 on lead 154 is then amplified by IF amplifier 156 and the output from the IF amplifier is fed to the detector section of the receiver 142.

In the square-law detector section 142, the output of IF amplifier 156 is applied to phase detectors 158 and 160, and additionally, a further output signal at the intermediate frequency is taken from the fixed local oscillator 153 which is applied to the phase detector 158 directly and to the phase detector 160 after passing through a 90° phase shifter 162.

For an intermediate frequency output from the IF amplifier 156 of magnitude E, the output of phase detectors 158 and 160 will be d.c. voltages proportional to E sin $\phi$ and E cos $\phi$, respectively, where $\phi$ varies with the phase of the received signal. The output of detectors 158 and 160 are respectively applied to square-law devices 164 and 166 which may comprise any non-linear element or circuit having a square-law characteristic. The outputs of the square-law devices 164 and 166 are then d.c. voltages proportional to $E^2\sin^2\phi$ and $E^2\cos^2\phi$, respectively, and these signals are combined in an adder 168 whose output on lead 170 is a signal corresponding to $E^2\sin^2\phi + E^2\cos^2\phi = E^2(\sin^2\phi + \cos^2\phi) = E^2$. Thus, the overall detection characteristic of the receiver is square-law, and the square-law detected signal $E^2$ from adder 168 is applied to low-pass filter 172 which averages the signal applied to it, resulting in a final receiver output signal corresponding to $\overline{E^2}$.

As previously mentioned, the varactor tuning in the receiver, specifically in the IF section, by the scanning generator 38 performs the electronic scanning function of the antenna beam 24 of the antenna 20 when employed with frequency-scanning type antennas. Alternatively, if a phase-shifting type antenna is employed, the output from the scanning generator 38 would be fed to the phase-shifters at the antenna in the well known manner for electronic scanning of such phase-shifting scanning antennas.

The selection of the type of antenna which should preverably be employed in the system depends on the intended use of the system or the type of mapping which is to be performed. In particular, where the system of the invention is to be used for terrain mapping where broad-band radiation is to be received, the antenna 20 should preferably be of the frequency-scanning type. On the other hand, if the system is to be employed for mapping transmitters, such as those transmitting or broadcasting "man-generated" signals, having well defined frequency ranges, then the antenna 20 should preferably be of the phase-shifting type. In either case, some shaping of the antenna pattern in elevation is desirable to equalize the signal-to-noise ratio of long-range and short-range emitters, and to provide approximately equal sensitivity to radiation from the ground for all ranges R.

Also, although the presently described system maps only on the scan of the beam in one direction, e.g., clockwise in FIG. 2, and uses a fast retrace, the principles of the invention may be applied to a system for mapping on the scan in both directions, but with greater complexity of apparatus.

With respect to the optical processor, although as particularly illustrated in FIG. 7 and described herein it employs means for rotating the signal film 30 about the optical axis, the relative rotation of the signal images with respect to the rest of the optical system may alternatively be accomplished by employing, for example, a dove prism or the like on the optical axis 74 of the processor and rotating the prism. This would result in the effecitve rotation of the cylindrical optics relative to the projected signal lines of the signal film at twice the rate of rotation of the prism about its longitudinal axis with the signal film stationary. Although the use of such a prism avoids the necessity for rotating the signal film and associated components, its presence in the optical path may introduce additional optical distortion in the system which is generally undesirable. Thus, the advantages of greater mechanical simplicity provided by the use of additional optical components must be weighed against the resulting increase in distortion for any particular application.

Further, although the present embodiment of the invention has been described as employing an optical system for transforming the signal lines on the signal record medium into a planimetric map, other forms of data processing means, such as a digital computer, may alternatively be employed for such transformation, but perhaps generally less advantageously. The transformation may be accomplished by integrating the recorded signals along straight line paths of various slopes and displacements, corresponding to emitters at various ranges and along-track positions, respectively. Also, the signal record medium itself need not be of an optical or photographic nature, but might be of a nature suitable to record the signal data by electrostatic or magnetic means.

Thus, an improved passive mapping system and method has been described which may be characterized in certain applications as sidelooking radiometry, as compared to conventional downlooking radiometry, and which is advantageous relative thereto in at least two respects: namely, (1) the range resolution degradation factor $R/h$ is not present, and (2) the resolution cell is approximately $\beta R$ in both range and cross-range (where $\beta$ is the azimuth beamwidth angle as previously described) and since only the azimuth beamwidth is significant, a long linear electronically scanned array along the side of the aircraft may be used to obtain much smaller values of $\beta$. Moreover, the present system and method are advantageous over those of the aforementioned copending application with respect to the capability of mapping large numbers of emitters in a continuous distribution with greater resolution.

As hereinbefore indicated, the principles of the present invention may be utilized for the present and other uses, with other forms of radiation, and at other than radio wavelengths, such as at infrared and light wavelengths using scanning lenses or mirrors. At light wavelengths, for example, the use of an optical spectrometer in conjunction with the present radiometry concept permits remotely locating and identifying sources of air pollution by mapping absorption rather than emission.

In general, although a preferred embodiment of the present invention has been illustrated and described, various modifications thereof will be apparent to those skilled in the art; and accordingly, the present invention should be defined only by the appended claims and equivalents thereof.

Various features of the invention are set forth in the following claims.

What is claimed is:

1. A passive radiation mapping system comprising radiation sensing means adapted to be moved relative to an area to be mapped along a path and having a receiving beam pattern for providing a signal indicative of the intensity of the radiation received thereby in the direction of the beam, means for causing the beam of said sensing means to angularly scan the area to be mapped about said sensing means as said sensing means is moved relative to the area along said path, recording means responsive to the signal from said sensing means for providing intensity modulated indicia in the form of data lines on a record medium corresponding to the angular scans of said sensing means and having varying slopes corresponding to radiation sources at varying ranges, and processing means responsive to the recorded data lines on said record medium for integrating the recorded data along paths on the record medium corresponding to radiation sources at various ranges and along-track positions and deriving therefrom a radiometric map on a further record medium of the area scanned by said sensing means.

2. A passive radiation mapping system comprising radiation sensing means adapted to be moved relative to an area to be mapped along a path and having a receiving beam pattern for providing a signal indicative of the intensity of the radiation received thereby in the direction of the beam, means for causing the beam of said sensing means to angularly scan the area to be mapped about said sensing means as said sensing means is moved relative to the area along said path, recording means responsive to the signals from said sensing means for providing intensity modulated indicia in the form of data lines on a record medium corresponding to the angular scans of said sensing means and having varying slopes corresponding to radiation sources at varying ranges, and processing means responsive to the recorded data lines on said record medium for converting each data line to a point on a further record medium at the appropriate range and along-track position, thereby producing a radiometric map on the further record medium of the area scanned by said sensing means, said recording means comprising means for producing said data lines with a first component in one coordinate on said medium corresponding to the tangent of the scan angle of said sensing means beam pattern and a second component in another coordinate on said medium corresponding to the distance of said sensing means from a predetermined location along said path.

3. The system of claim 1 wherein said means comprises a square-law receiver responsive to the signals from said sensing means for providing an output signal linear in average power relative to its input and circuit means responsive to the output of said receiver for providing a bipolar signal corresponding to the receiver output signal less its average value component.

4. The system of claim 3 wherein said circuit means comprises a differentiator.

5. The system of claim 3 wherein said means further comprises means for combining a bias signal with said bipolar signal to provide a unipolar signal having an average value component substantially less than said first mentioned average value component.

6. The system of claim 5 comprising a beam producing means for providing an intensity modulated energy beam in response to said unipolar signal, and means for deflecting said beam along a given axis in synchronism with the angular scanning of the receiving beam pattern.

7. The system of claim 6 comprising means for moving said record medium across the deflection axis of said beam at a speed corresponding to the velocity of said sensing means along said path relative to said area to be mapped.

8. The system of claim 6 wherein said beam producing means comprises a cathode-ray tube.

9. A passive radiation mapping system comprising radiation sensing means adapted to be moved relative to an area to be mapped along a path and having a receiving beam pattern for providing a signal indicative of the intensity of the radiation received thereby in the direction of the beam, means for causing the beam of said sensing means to angularly scan the area to be mapped about said sensing means as said sensing means is moved relative to the area along said path, recording means responsive to the signals from said sensing means for providing intensity modulated indicia in the form of data lines on a record medium corresponding to the angular scans of said sensing means, and processing means responsive to the recorded data lines on said record medium for deriving therefrom a radiometric map on a further record medium of the area scanned by said sensing means, said processing means comprising means for selecting only certain data lines on said record medium corresponding to a given range, and means for converting said data lines to data points corresponding resepectively to emitting points of the area to be mapped and being spaced apart respective distances corresponding to the distances along said path.

10. The system of claim 9 wherein said processing means comprises means for moving said record mediums in synchronism to plot said data points from each of the data lines corresponding to the desired ranges in succession to form said output map.

11. The system of claim 1 wherein said processing means comprises means for deriving from said data lines the range and location of each emitting point of said area.

12. The system of claim 11 wherein said record medium is an optical film and said processing means comprises means for producing a collimated beam of coherent light, means for passing said light through said record film along an optical axis, a cylindrical lens system having a preferred axis-selecting characteristic located along said optical axis, and means for causing relative rotation between the data lines on said film and said cylindrical lens system so that the signal lines of different slopes, corresponding to radiation sources at different ranges, are successively collapsed as points on said further record medium.

13. The system of claim 12 wherein said further record medium is an optical film and said system comprises means for moving said further film in a direction parallel to the axis-selecting characteristic of said cylindrical lens system.

14. A method for passive radiation mapping comprising the steps of moving a radiation sensing means along a path relative to an area to be mapped, said sensing means having a receiving beam pattern, causing a receiving beam pattern of said sensing means to angularly scan the area to be mapped about said sensing means as it is moved relative to the area along said path, recording signals from said sensing means to provide intensity modulated indicia in the form of data lines on a record medium corresponding to the angular scans of said sensing means and having varying slopes corresponding to radiation sources at varying ranges, and processing the recorded data lines on said record medium by integrating the data lines along paths on the record medium corresponding to radiation sources at various ranges and along-track positions to derive therefrom a radiometric map on a further record medium of the area scanned by said sensing means.

15. The method of claim 14 wherein the step of recording the signals from said sensing means includes producing said data lines with a first component in one coordinate on said medium corresponding to the tangent of the scan angle of said sensing means beam pattern and a second component in another coordinate on said medium corresponding to the distance of said sensing means from a predetermined location along said path.

16. The method of claim 15 wherein said record medium is an optical film, said method comprising passing a collimated beam of coherent light through said record film along an optical axis and collapsing lines of a given slope into sharp points on an image plane.

17. The method of claim 16 wherein the data signal lines on the film are rotated to successively collapse the lines having slopes within a given range.

18. The method of claim 17 comprising moving said further record medium across said optical axis in synchronism with the rotation of said film to successively plot the radiating points at each range.

* * * * *